United States Patent
Brosh

(10) Patent No.: US 9,980,469 B2
(45) Date of Patent: May 29, 2018

(54) OFFSHORE AQUACULTURE SYSTEM

(71) Applicant: SEA CONTROL HOLDINGS LTD., Zikhron Ya'akov (IL)

(72) Inventor: Shay Brosh, Zikhron Ya'akov (IL)

(73) Assignee: SEA CONTROL HOLDINGS LTD., Zikhron Ya'akov (IL)

( * ) Notice: Subject to any disclaimer, the term of this patent is extended or adjusted under 35 U.S.C. 154(b) by 28 days.

(21) Appl. No.: 14/399,212

(22) PCT Filed: May 6, 2013

(86) PCT No.: PCT/IL2013/050381
§ 371 (c)(1),
(2) Date: Nov. 6, 2014

(87) PCT Pub. No.: WO2013/168147
PCT Pub. Date: Nov. 14, 2013

(65) Prior Publication Data
US 2015/0083050 A1    Mar. 26, 2015

(30) Foreign Application Priority Data

May 8, 2012 (GB) .................................. 1207999.2

(51) Int. Cl.
*A01K 61/00* (2017.01)
*A01K 61/60* (2017.01)
*B63B 35/44* (2006.01)

(52) U.S. Cl.
CPC .............. *A01K 61/00* (2013.01); *A01K 61/60* (2017.01); *B63B 2035/4493* (2013.01); *Y02A 40/826* (2018.01)

(58) Field of Classification Search
CPC .... A01K 61/00; A01K 61/002; A01K 61/007; A01K 63/00; A01K 63/02
(Continued)

(56) References Cited

U.S. PATENT DOCUMENTS

| 4,147,130 A | * | 4/1979 | Goguel | ................ | A01K 61/007 |
| | | | | | 119/223 |
| 4,244,323 A | * | 1/1981 | Morimura | ............ | A01K 61/007 |
| | | | | | 119/223 |

(Continued)

FOREIGN PATENT DOCUMENTS

| CN | 201796308 | 4/2011 |
| CN | 202190635 | 4/2012 |

(Continued)

OTHER PUBLICATIONS

European Search Report of European Application No. EP13788434.2 mailed on Dec. 18, 2015.
(Continued)

*Primary Examiner* — Trinh T Nguyen
(74) *Attorney, Agent, or Firm* — Pearl Cohen Zedek Latzer Baratz LLP

(57) ABSTRACT

An offshore aquaculture system based on a semisubmersible platform having storage and maintenance facilities for supporting aquaculture with an attached framework, to which net covered rigid aquaculture cages are movably connected and controllably positioned according to sea conditions. The cages may be sunk or raised to protect the aquaculture products, and all maintenance and feeding is carried out by crew onboard the platform.

18 Claims, 6 Drawing Sheets

(58) Field of Classification Search
USPC ....... 119/207, 208, 209, 210, 223, 224, 226, 119/238, 239, 240; 43/102, 103, 104, 43/105
See application file for complete search history.

(56) References Cited

U.S. PATENT DOCUMENTS

| | | | |
|---|---|---|---|
| 4,257,350 A * | 3/1981 | Streichenberger | A01K 61/007 119/223 |
| 4,285,298 A * | 8/1981 | Dugan | A01K 73/12 119/207 |
| 4,487,588 A * | 12/1984 | Lewis, III | A01G 31/02 441/43 |
| 4,716,854 A | 1/1988 | Bourdon | |
| 5,549,076 A * | 8/1996 | Kaarstad | A01K 61/007 119/223 |
| 5,617,813 A * | 4/1997 | Loverich | A01K 61/007 119/223 |
| 5,628,279 A * | 5/1997 | Bones, IV | A01K 61/007 119/215 |
| 5,845,602 A * | 12/1998 | Kaarstad | A01K 61/007 119/223 |
| 5,967,086 A * | 10/1999 | Knott, Sr. | A01K 61/007 119/223 |
| 6,044,798 A * | 4/2000 | Foster | A01K 61/007 119/223 |
| 6,216,635 B1 * | 4/2001 | McRobert | A01K 61/007 119/201 |
| 6,386,146 B1 * | 5/2002 | Knott, Sr. | A01K 61/007 119/223 |
| 6,481,378 B1 | 11/2002 | Zemach | |
| 6,892,672 B2 * | 5/2005 | Klein | A01K 61/007 114/123 |
| 7,650,856 B2 * | 1/2010 | Quinta Cortinas | A01K 61/002 119/223 |
| 7,743,733 B2 * | 6/2010 | Harrison | A01K 61/02 119/210 |
| 7,992,522 B2 * | 8/2011 | Harrison | A01K 61/007 119/210 |
| 2006/0130772 A1 * | 6/2006 | Mortensen | A01K 61/002 119/240 |
| 2008/0029040 A1 * | 2/2008 | Quinta Cortinas | A01K 61/002 119/208 |
| 2008/0035070 A1 * | 2/2008 | Harrison | A01K 61/007 119/223 |
| 2009/0288612 A1 * | 11/2009 | Himmelstrup | A01K 61/007 119/223 |
| 2010/0192868 A1 * | 8/2010 | Quinta Cortinas | A01K 61/002 119/208 |
| 2012/0006277 A1 * | 1/2012 | Troy | A01K 61/007 119/223 |

FOREIGN PATENT DOCUMENTS

| | | |
|---|---|---|
| CN | 102119677 | 10/2012 |
| CN | 101878742 | 8/2013 |
| EP | 0158160 | 10/1985 |
| EP | 0080414 | 3/1987 |
| EP | 0347489 | 12/1989 |
| EP | 0612210 | 8/1994 |
| ES | 2174759 | 12/2003 |
| FR | 2639511 | 6/1990 |
| GR | 890100792 | 4/1992 |
| JP | H02-53426 | 2/1990 |
| JP | 2002-130113 | 5/2002 |
| JP | 2005335872 | 12/2005 |
| KR | 20090067387 | 6/2009 |
| KR | 100963763 | 6/2010 |
| KR | 20100108316 | 10/2010 |
| NO | 177551 | 7/1995 |
| WO | WO 87/04590 | 8/1987 |
| WO | WO 90/09100 | 8/1990 |
| WO | WO 2004/043777 | 5/2004 |

OTHER PUBLICATIONS

International Search Report of PCT Application No. PCT/IL2013/050381 dated Aug. 19, 2013.

* cited by examiner

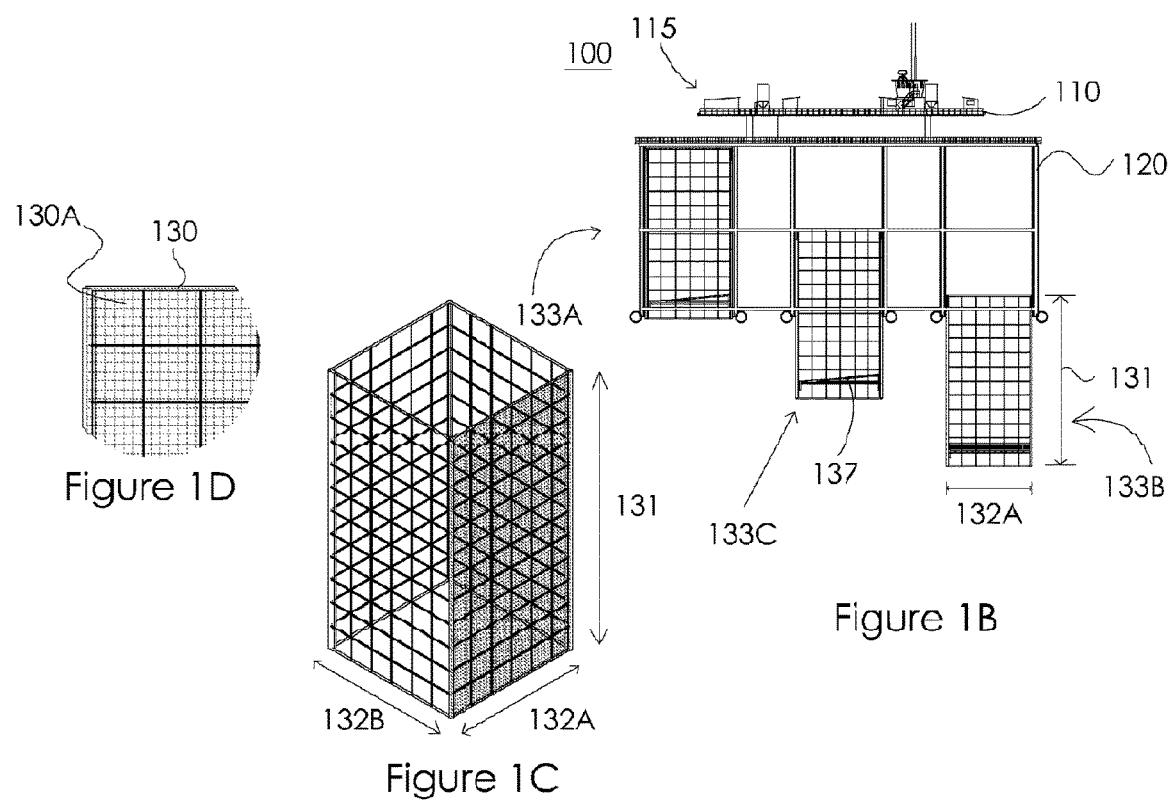

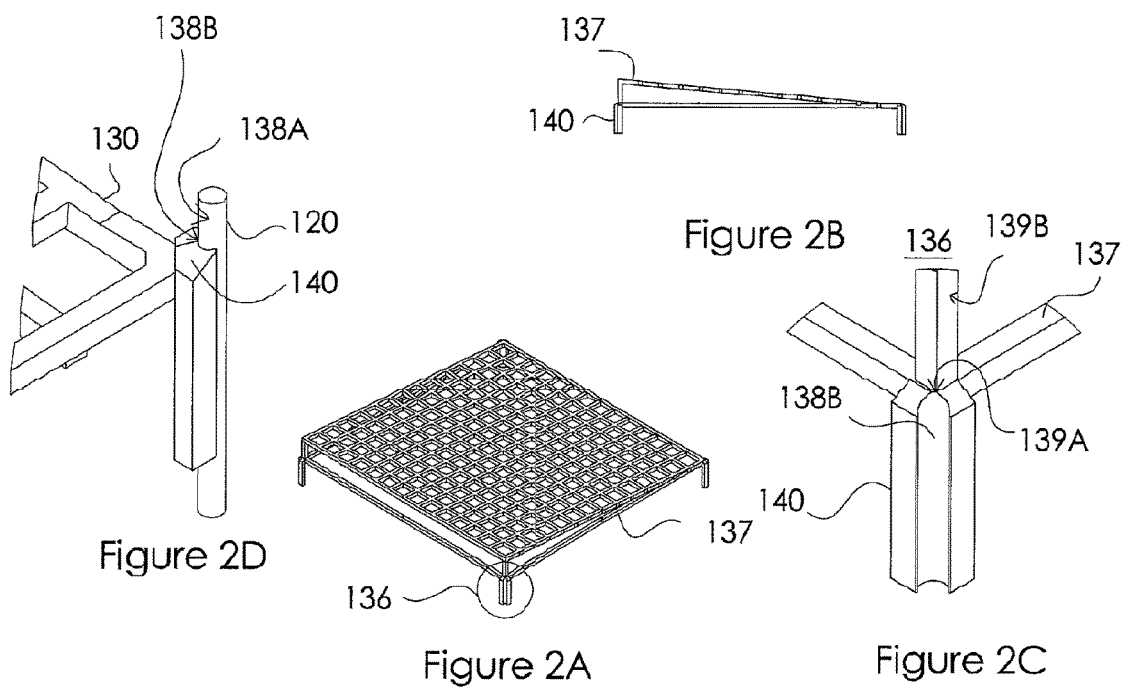

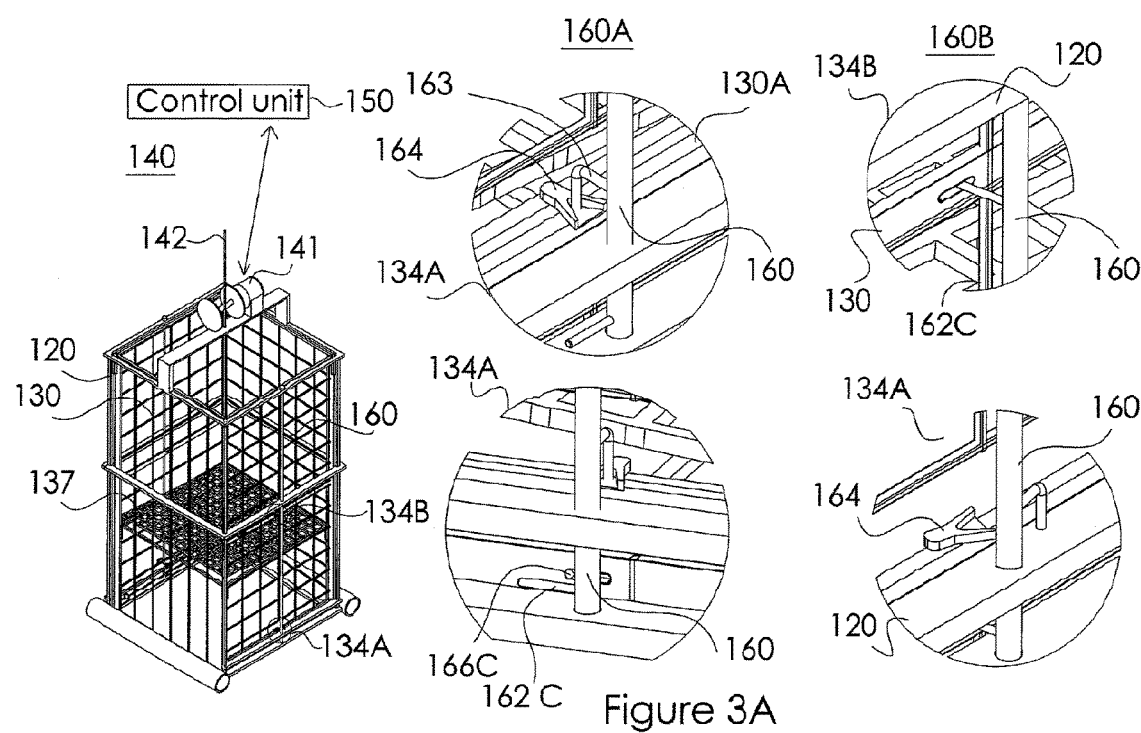

OFFSHORE AQUACULTURE SYSTEM

CROSS-REFERENCE TO RELATED APPLICATIONS

This application is a National Phase Application of PCT International Application No. PCT/IL2013/050381, International Filing Date May 6, 2013, claiming priority of United Kingdom Patent Application No. 1207999.2, filed May 8, 2012, which is hereby incorporated by reference.

BACKGROUND

1. Technical Field

The present invention relates to the field of aquaculture, and more particularly, to offshore aquaculture.

2. Discussion of Related Art

Offshore aquaculture is experiencing an expansion but has to cope with rougher sea conditions than the more traditional near-shore aquaculture.

A solution to rough sea conditions has been proposed in WIPO document number 2004043777 teaching a flexible fish cage system for open sea aquaculture using a mono-buoy plus special frame design to absorb the wave energy. The system includes a flexible construction holding the fish nets and is submersible by an air pumping mechanism which displaces water out of water fillable tanks.

BRIEF SUMMARY

One aspect of the present invention provides an offshore aquaculture system comprising: a semisubmersible platform having storage and maintenance facilities for supporting aquaculture, a framework connected to the semisubmersible platform, a plurality of net covered rigid aquaculture cages movably connected by a controllable positioning apparatus to the framework, wherein a vertical dimension of the cages is larger than horizontal dimensions thereof and the cages are vertically movable in respect to the platform, and a control unit arranged to control the positioning apparatus and to determine a depth of the plurality of rigid aquaculture cages in respect to sea level according to sea conditions.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 1A-1D are high level schematic illustrations of an offshore aquaculture system according to some embodiments of the invention;

FIGS. 2A-2D are high level schematic illustrations of cage floor and cage attachment details of the offshore aquaculture system according to some embodiments of the invention;

FIGS. 3A-3D are high level schematic illustrations of a positioning apparatus and a locking mechanism in the offshore aquaculture system according to some embodiments of the invention.

DETAILED DESCRIPTION

Figure 1A:
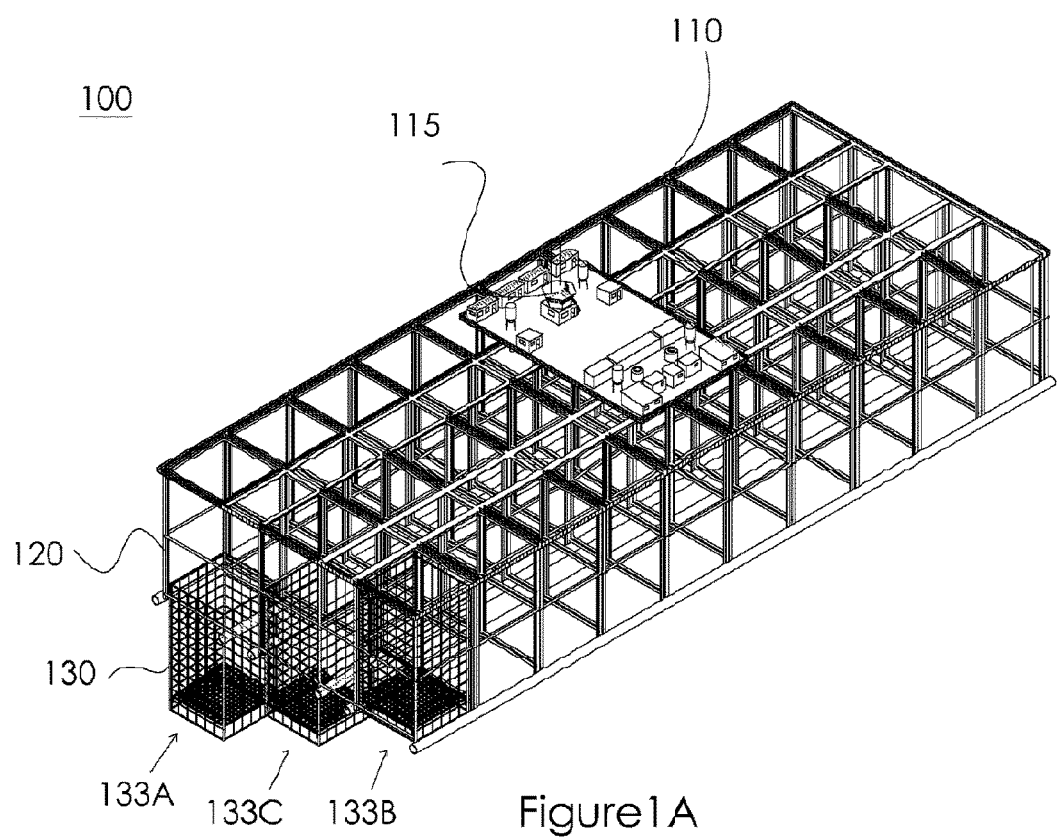
Figure 3C:
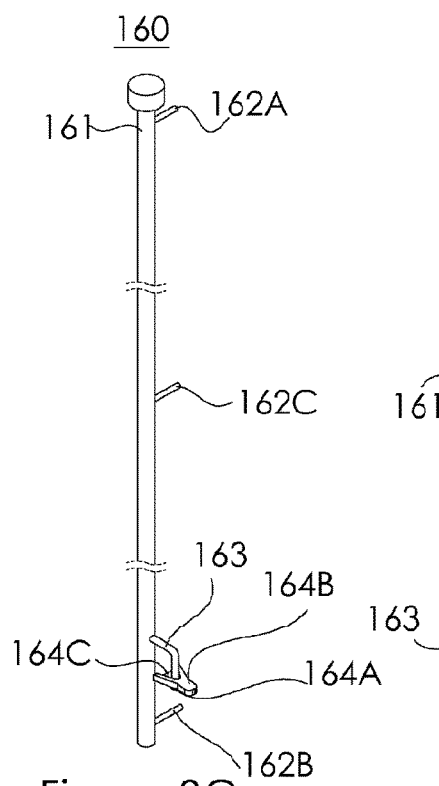
Figure 3B:
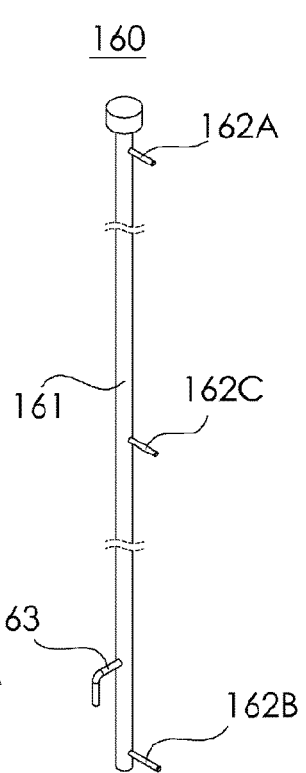
Figure 3D:
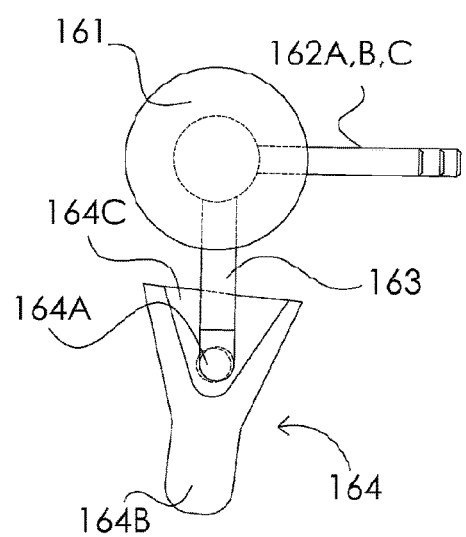

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIGS. 1A-1D are high level schematic illustrations of an offshore aquaculture system 100 according to some embodiments of the invention. FIGS. 2A-2D are high level schematic illustrations of cage floor 137 and cage attachment details of the offshore aquaculture system 100 according to some embodiments of the invention.

Offshore aquaculture system 100 comprises a semisubmersible platform 110 having storage and maintenance facilities 115 for supporting aquaculture. A framework 120 is connected to semisubmersible platform 110, mostly below the water level. Framework 120 is arranged to withstand sea conditions and support a plurality of net covered rigid aquaculture cages 130 used for aquaculture. Semisubmersible platform 110 together with framework 120 and cages 130 is stable and adapted for long operation periods on sea. Framework 120 may extend far beyond the area of semisubmersible platform 110 to support a large number of cages 130. Framework 120 may be rectangular and support cages 130 arranged in a grid form.

Cages 130 may be adapted to various types of aquaculture, e.g. fish, clams, ornamentals etc. Cages 130 are covered with net 130A (FIG. 1D) to maintain the cultured organisms within them. Cages 130 are vertically elongated, i.e. they have a vertical dimension 131 that is larger than horizontal dimensions 132A, 132B (FIG. 1C) of cages 130. For example, cages 130 may be 30 m in vertical dimension 131 and 15 m in horizontal dimensions 132A, 132B. Cages 130 may have inclined floor 137 to facilitate fish removal from cages 130. Framework 120 may be of the vertical dimension of cages 130, i.e. be constructed as deep as vertical dimension 131 or somewhat deeper.

Fish may be removed using suction, pumping, a crane or a screw pump.

Offshore aquaculture system 100 may further comprise a sorting system, arranged to sort fish by size and move them between cages 130 according to their size as they grow.

Maintenance facilities 115 may comprise a computerized center for monitoring cages 130 and the fish (visually, chemically etc.), for example, measure the biomass of the fish, manage and control the feeding process, detect signs for diseases, and allow the crew to continuously supervise the aquaculture.

Offshore aquaculture system 100 may further comprise facilities that allow the crew to perform maintenance around the clock, with cages 130 below water, including disassembling and replacing parts.

Semisubmersible platform 110 may comprise an operable interface to docking ships, allowing for supplies and fish transport, and a helicopter landing place for supplies and removal of the fish.

FIGS. 3A-3D are high level schematic illustrations of a positioning apparatus 140 and a locking mechanism 160 in offshore aquaculture system 100 according to some embodiments of the invention.

Cages 130 are movably connected to framework 120 by controllable positioning apparatus 140 and are vertically movable in respect to platform 110. Positioning apparatus 140 may be arranged to allow movement of cages 130 between an upper position 133A in which cages 130 are vertically contained within framework 120 and a lower position 133B in which cages 130 are positioned below framework 120. Cages 130 may have additional intermediate positions 133C (FIG. 1B). Controllable positioning apparatus 140 may comprise rails 138A being part of framework 120 (FIG. 2D) along which cages 130 may slide, and a motor 141 (FIG. 3A) connected to cage 130, controlled by control unit 150, and arranged to move cage 130 vertically. Inclined floor 137 may also slide along an inner railing 139A that is part of cage 130. A sliding face 138B of cages 130 and a sliding face 139B of floor 137 may mechanically remove (e.g. by scraping) biofouling from the sliding interfaces. The relative movement of cages 130 in respect to framework 120 and of floor 137 in respect to cage 130 may also be carried out by means other than sliding, e.g. by wheels. Alternatively or additionally, biofouling may be removed from cages 130 by an underwater robot using water jets.

System 100 further comprises a control unit 150 arranged to control positioning apparatus 140 and to determine a depth of rigid aquaculture cages 130 in respect to sea level according to sea conditions. Control unit 150 may comprise meteorological sensors and may be arranged to determine the optimal depth of cages 130 automatically in respect to measured and anticipated sea conditions, based on measurements from the meteorological sensors.

Controllable positioning apparatus 140 may comprise motor 141 connected to cage 130 by a vertical cable 142 connected to vertically movable floor 137 of cage 130. Motor 141 may be positioned on platform 110 and tension may be transmitted to cables 142 of each cage 130 over a crank, winch, or any other mechanical apparatus. Motor 141 may be electric, hydraulic or of any type applicable to the required forces. Motor 141 may be replaced and assisted by a crane onboard semisubmersible platform 110. Semisubmersible platform 110 may further comprise buoyancy mechanisms such as inflatable tubes, containers or other elements which may change their buoyancy under control of control unit 150.

Controllable positioning apparatus 140 may comprise a locking mechanism 160 for positioning cages 130 and floor 137. In one example, illustrated in FIGS. 3A-3D, locking mechanism 160 may comprise a rotatable vertical shaft 161 comprising several parallel pins 162 (here denoted as 162A, 162B and 162C) at specified heights along shaft 161, pins 162 fitting into corresponding holes 166 (here denoted as 166A, 166B and 166C) in cage 130. Each cage 130 comprises a pivoted rotatable tab 164 adjacent to an edge of floor 137, that is locked by a protrusion 163 from shaft 161, protrusion 163 being part of locking mechanism 160.

Protrusion 163 fits into rotatable tab 164 and is arranged to rotate tab 164 upon rotation of shaft 161. For example, tab 164 may be pivotally connected to cage 130 at pivot 164A, have a socket 164C that receives protrusion 163 and a stopper 164B.

Locking mechanism 160 has a floor locking position 160A and a cage locking position 160B that are interchangeable by rotation of the shaft 161.

In floor locking position 160B, protrusion 163 holds tab 164 to connect floor 137 to cage 130 (detail 134A in FIG. 3A) upon an upwards vertical movement to allow moving cage 130 vertically by cable 142. As cable 142 is connected to floor 137 and tab 164 is rotated such that stopper 164B protrudes from cage 130 above floor 137, pulling floor 137 upwards results in lifting whole cage 130 (detail 134A in FIG. 3A).

In cage locking position 160A, protrusion 163 releases tab 164 (e.g. by rotation to a position parallel to the edge of cage 130 and not above floor 137) to free floor 137 (detail 134A in FIG. 3A). Furthermore, pins 162 are inserted (e.g. by the same rotation) into corresponding holes 166 in cage 130 (pins 162A, 162B and 162C corresponding to holes 166A, 166B and 166C, respectively), to allow moving floor 137 vertically while fixating cage 130 (detail 134B in FIG. 3A).

For example, cages 130 may be lowered at rough sea, to avoid damage to fish due to storm conditions and strong waves. During calm sea periods, cages 130 may be in shallower water according to the requirements for the grown organisms. This mechanism and control pattern protect the fish or other organisms that are cultured, yet require a relatively small interventional effort—the cages don't have to be moved horizontally, and no additional vessel and personnel are required for protecting or moving the cages. Moreover, the reaction times of control unit 150 are relatively short, as no intervention from shore is needed, and sea conditions are measured at location. Raising floor 137 may allow easier handling of the fish in cage 130.

Cages 130 may further comprise additional partitions (not shown) that are used to control the volume in which fish are within cages 130, in order to control their growth conditions and allow easier collection of the fish. The partition may be movable, and their motion coordinated with movements of cages 130 in order to protect the fish and make the change in conditions gradual. For example upon forecasts of rough sea, fish may be lower within cages 130 by the partitions, and upon realization of the forecast cages 130 may be lowered while the partitions may be temporally raised, to allow more time for accommodation of the fish. Eventually, when maximal depth is required, both cages 130 and the partitions may be lowered. The partitions may be further used to control the types or sizes of fish within each cage 130.

Figure 4:
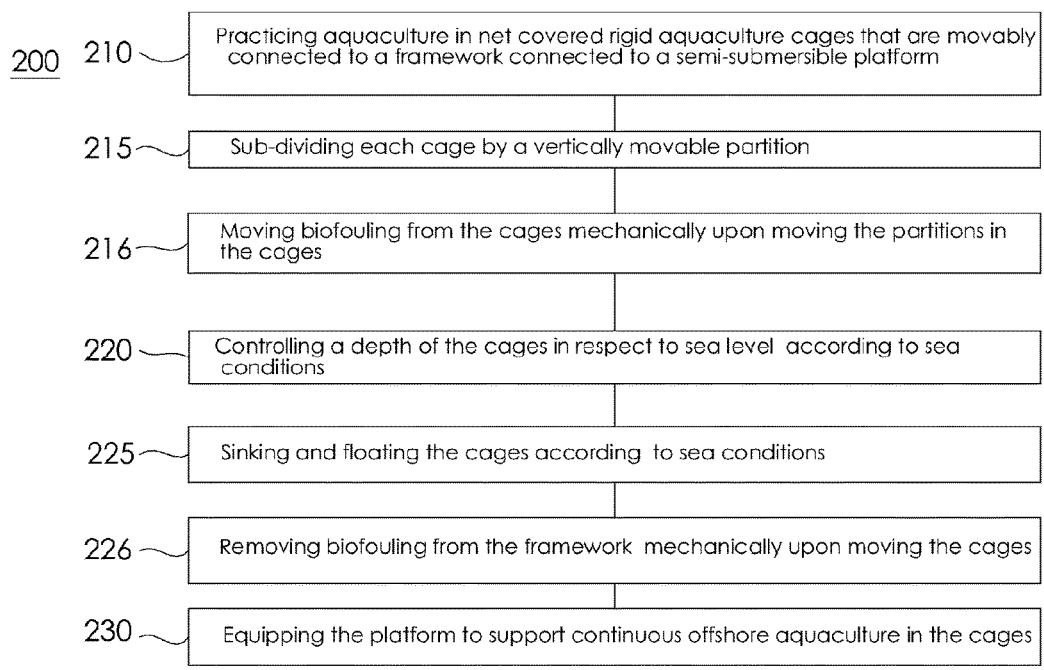
FIG. 4 is a high level flowchart illustrating an offshore aquaculture method, according to some embodiments of the invention.

FIG. 4 is a high level flowchart illustrating an offshore aquaculture method 200, according to some embodiments of the invention.

Method 200 comprises the following stages: (stage 210) practicing aquaculture in a plurality of net covered rigid aquaculture cages that are movably connected to a framework connected to a semi-submersible platform, wherein a vertical dimension of the cages is larger than horizontal dimensions thereof and the cages are vertically movable in respect to the framework, (stage 220) controlling a depth of the cages in respect to sea level according to sea conditions, and (stage 230) equipping the platform to support continuous offshore aquaculture in the cages.

Method 200 may further comprise sinking and floating the cages according to sea conditions (stage 225).

Method 200 may further comprise sub-dividing each cage by a vertically movable partition or a vertically movable floor (stage 215).

Method 200 may further comprise removing biofouling from the framework mechanically upon moving the cages (stage 226) and removing biofouling from the cages mechanically upon moving the partitions in the cages (stage 216).

Method 200 may further comprise maintaining the cages underwater (stage 240).

Proposed system 100 and method 200 have several advantages over prior art WIPO document number 2004043777: (i) the rigidity of cages 130 and framework 120 confer higher stability and durability of system 100 under open sea conditions, (ii) the vertical motion of cages 130 is carried out more reliably, in close correlation with prevailing sea conditions and without much delays that may result in the prior art from the need for intervention by personnel coming from the shore, and (iii) maintenance from onboard platform 110 is much more reliable and accurate then maintenance from shore—e.g. feeding is carried out on time irrespective of sea conditions and emergencies are quickly handled.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. An offshore aquaculture system comprising:
    a semisubmersible platform comprising buoyancy mechanisms controllable to change buoyancy of the semisubmersible platform and having storage and maintenance facilities for supporting aquaculture,
    a framework separate from the semisubmersible platform and connected thereto, wherein the framework is submerged below sea level
    a plurality of net covered rigid aquaculture cages movably connected by a controllable positioning apparatus to the framework, wherein the cages are enclosed within the framework and are vertically movable with respect to the framework,
    a control unit arranged to control the positioning apparatus and to determine a depth of the plurality of rigid aquaculture cages with respect to sea level according to sea conditions, wherein the positioning apparatus comprises a locking mechanism that has a floor locking position in which the cage is movable with respect to the platform and a cage locking position in which the floor is movable with respect to the cage whilst the cage is fixed with respect to the platform.

2. The offshore aquaculture system of claim 1, wherein the positioning apparatus is arranged to mechanically remove foulants from the framework upon movements of the cages with respect to the framework.

3. The offshore aquaculture system of claim 1, wherein each cage further comprises a vertically movable partition connected by a partition positioning apparatus to the cage and controlled by the control unit.

4. The offshore aquaculture system of claim 3, wherein the positioning apparatus is arranged to mechanically remove foulants from the framework upon movements of the cages in respect to the framework, and in each cage the partition positioning apparatus is arranged to remove foulants from the cage upon movements of the partition with respect to the cage.

5. The offshore aquaculture system of claim 3, wherein the partition is an incline floor of the cage.

6. The offshore aquaculture system of claim 1, wherein the controllable positioning apparatus of each cage comprises:
    a plurality of vertical rails being part of the framework, wherein the cage is vertically slidable along the rails, and
    a motor connected to the cage, controlled by the control unit and arranged to move the cage vertically.

7. The offshore aquaculture system of claim 6, wherein
    the motor connected to the cage by a vertical cable connected to a vertically movable floor of the cage, and
    each cage further comprises a pivoted rotatable tab adjacent to an edge of the floor,
    the controllable positioning apparatus comprising a locking mechanism comprising:
    a rotatable vertical shaft comprising a plurality of parallel pins at specified heights along the shaft, the pins fitting into corresponding holes in the cage,
    a protrusion fitting into the rotatable tab and arranged to rotate the tab upon rotation of the shaft,
    wherein
        the locking mechanism has a floor locking position and a cage locking position that are interchangeable by rotation of the shaft,
        in the floor locking position the protrusion holds the tab to connect the floor to the cage upon an upwards vertical movement to allow moving the cage vertically, and
        in the cage locking position the protrusion releases the tab to free the floor and the pins are inserted into the corresponding holes in the cage, to allow moving the floor vertically while fixating the cage.

8. The offshore aquaculture system of claim 1, wherein the framework is of the vertical dimension of the cages and the positioning apparatus is arranged to allow movement of the cages between an upper position in which the cages are vertically contained within the framework and a lower position in which the cages are positioned below the framework.

9. The offshore aquaculture system of claim 1, wherein the control unit comprises meteorological sensors and is arranged to determine the depth of the cages automatically in respect to measured and anticipated sea conditions, based on measurements from the meteorological sensors.

10. The offshore aquaculture system of claim 1, wherein vertical dimension of the cages is at least 30 m and the horizontal dimensions of cages are at least 15 m.

11. An offshore aquaculture method comprising:
practicing aquaculture in a plurality of net covered rigid aquaculture cages that are movably connected to a framework, which is separate from and connected to a semi-submersible platform, the submersible platform comprising buoyancy mechanisms controllable to change buoyancy of the semi-submersible platform, wherein the framework is submerged below sea level, and wherein the cages are enclosed within the framework and are vertically movable with respect to the framework,
controlling a depth of the cages with respect to sea level according to sea conditions using a controllable positioning apparatus movably connecting the cages to the framework and controlled by a control unit, and
equipping the platform to support continuous offshore aquaculture in the cages, wherein the positioning apparatus comprises a locking mechanism that has a floor locking position in which the cage is movable with respect to the platform and a cage locking position in which the floor is movable with respect to the cage whilst the cage is fixed with respect to the platform.

12. The offshore aquaculture method of claim 11, further comprising sinking and floating the cages according to sea conditions.

13. The offshore aquaculture method of claim 11, further comprising removing biofouling from the framework mechanically upon moving the cages.

14. The offshore aquaculture method of claim 11, further comprising sub-dividing each cage by a vertically movable partition or a vertically movable floor.

15. The offshore aquaculture method of claim 14, further comprising removing biofouling from the cages mechanically upon moving the partition or the floor in the cages.

16. The offshore aquaculture method of claim 11, further comprising maintaining the cages underwater.

17. The system of claim 1, wherein
the control unit is arranged to control the positioning apparatus, wherein
the positioning apparatus comprises a locking mechanism that has a floor locking position in which the cage is movable with respect to the platform and a cage locking position in which the floor is movable with respect to the cage whilst the cage is fixed with respect to the platform.

18. An offshore aquaculture system comprising:
a semisubmersible platform comprising buoyancy mechanisms controllable to change buoyancy and having storage and maintenance facilities for supporting aquaculture,
a framework, comprising a plurality of rails, connected to the semisubmersible platform,
a plurality of net covered rigid aquaculture cages movably connected by a controllable positioning apparatus to the framework, wherein the cages are vertically movable with respect to the platform,
a control unit arranged to control the positioning apparatus and to determine a depth of the plurality of rigid aquaculture cages with respect to sea level according to sea conditions, and
a motor connected to the cage, controlled by the control unit and arranged to move the cage vertically, wherein
the motor connected to the cage by a vertical cable connected to a vertically movable floor of the cage, and
each cage further comprises a pivoted rotatable tab adjacent to an edge of the floor,
the controllable positioning apparatus comprising a locking mechanism comprising:
a rotatable vertical shaft comprising a plurality of parallel pins at specified heights along the shaft, the pins fitting into corresponding holes in the cage,
a protrusion fitting into the rotatable tab and arranged to rotate the rotatable tab upon rotation of the shaft, wherein
the locking mechanism has a floor locking position and a cage locking position that are interchangeable by rotation of the shaft,
in the floor locking position the protrusion holds the rotatable tab to connect the floor to the cage upon an upwards vertical movement to allow moving the cage vertically, and
in the cage locking position the protrusion releases the tab to free the floor and the pins are inserted into the corresponding holes in the cage, to allow moving the floor vertically while affixing the cage.

* * * * *